US012700544B2

(12) United States Patent
Muramatsu

(10) Patent No.: US 12,700,544 B2
(45) Date of Patent: *Aug. 4, 2026

(54) MULTILAYER CERAMIC CAPACITOR

(71) Applicant: Murata Manufacturing Co., Ltd., Nagaokakyo (JP)

(72) Inventor: Satoshi Muramatsu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,795

(22) Filed: Mar. 29, 2023

(65) Prior Publication Data

US 2023/0230774 A1 Jul. 20, 2023

Related U.S. Application Data

(63) Continuation of application No. 17/665,758, filed on Feb. 7, 2022, now Pat. No. 11,646,162, which is a
(Continued)

(30) Foreign Application Priority Data

Jan. 23, 2019 (JP) ................................ 2019-009747

(51) Int. Cl.
*H01G 4/30* (2006.01)
*H01G 2/02* (2006.01)
(Continued)

(52) U.S. Cl.
CPC ................. *H01G 4/30* (2013.01); *H01G 2/02* (2013.01); *H01G 4/012* (2013.01); *H01G 4/1218* (2013.01)

(58) Field of Classification Search
CPC ...... H01G 4/301; H01G 4/1218; H01G 4/012; H01G 2/02; H01G 4/30; H01G 4/248; H01G 4/228; H10G 4/232
(Continued)

(56) References Cited

U.S. PATENT DOCUMENTS

| | | | | |
|---|---|---|---|---|
| 6,331,930 B1 * | 12/2001 | Kuroda | .................... | H01G 4/30 |
| | | | | 361/308.1 |
| 7,672,112 B2 * | 3/2010 | Hattori | .................... | H01G 4/232 |
| | | | | 361/321.1 |

(Continued)

OTHER PUBLICATIONS

Muramatsu, "Multilayer Ceramic Capacitor", U.S. Appl. No. 17/665,758, filed Feb. 7, 2022.

*Primary Examiner* — Arun Ramaswamy
(74) *Attorney, Agent, or Firm* — Keating & Bennett, LLP

(57) ABSTRACT

A multilayer ceramic capacitor includes a stacked body and external electrodes. The stacked body includes stacked dielectric layers and internal electrodes. The external electrodes are disposed on lateral surfaces of the stacked body and are connected to the internal electrodes. The dielectric layers include outer layer portions and an effective layer portion. Each outer layer portion is adjacent to a corresponding main surface of the stacked body. Each outer layer portion is a dielectric layer located between a corresponding main surface and an internal electrode closest to the main surface. A ratio of a dimension of the effective layer portion in a stacking direction to a dimension of the stacked body in the stacking direction is not less than about 53% and not more than about 83%.

17 Claims, 12 Drawing Sheets

Related U.S. Application Data continuation of application No. 16/747,632, filed on Jan. 21, 2020, now Pat. No. 11,282,647.

(51) Int. Cl.
H01G 4/012 (2006.01)
H01G 4/12 (2006.01)

(58) Field of Classification Search
USPC .......... 361/301.4, 321.3, 321.2, 306.3, 321.1
See application file for complete search history.

(56) References Cited

U.S. PATENT DOCUMENTS

| | | | | |
|---|---|---|---|---|
| 2009/0097187 A1 * | 4/2009 | Dattaguru | .............. | H01G 4/232 |
| | | | | 361/321.2 |
| 2014/0185184 A1 * | 7/2014 | Ahn | ........................ | H01G 4/232 |
| | | | | 361/301.4 |
| 2014/0185189 A1 * | 7/2014 | Kim | ......................... | H01G 4/30 |
| | | | | 361/321.2 |
| 2015/0049412 A1 * | 2/2015 | Kim | ......................... | H01G 4/30 |
| | | | | 156/89.12 |
| 2018/0019064 A1 * | 1/2018 | Han | ......................... | H01G 4/30 |
| 2018/0027656 A1 * | 1/2018 | Jung | ......................... | H01G 4/30 |
| | | | | 174/260 |
| 2020/0126719 A1 * | 4/2020 | Lee | ......................... | H01G 4/232 |

* cited by examiner

MULTILAYER CERAMIC CAPACITOR

CROSS REFERENCE TO RELATED APPLICATIONS

This application claims the benefit of priority to Japanese Patent Application No. 2019-009747 filed Jan. 23, 2019. The entire contents of this application are hereby incorporated herein by reference.

BACKGROUND OF THE INVENTION

1. Field of the Invention

The present invention relates to a multilayer ceramic capacitor.

2. Description of the Related Art

In recent years, electronic devices, such as mobile telephones and mobile music players, have been reduced in size and thickness. The electronic devices have multiple multilayer ceramic electronic components embedded in or mounted on substrates, and the multilayer ceramic electronic components also have been reduced in size and thickness in association with the reduction in size of electronic devices. With a reduction in thickness of multilayer ceramic capacitors, how to secure the strength of the multilayer ceramic capacitors has been an issue.

As a multilayer ceramic electronic component having an improved chip strength, a multilayer ceramic capacitor to be embedded in a substrate as described in Japanese Patent Laid-Open No. 2015-65394 was proposed. The multilayer ceramic capacitor includes external electrodes having band surfaces with a predetermined length or longer, so that the external electrodes can connect to external interconnections through via holes. At the same time, the external electrodes have a reduced thickness so as to increase the ceramic body thickness in the entire chip thickness, thereby preventing cracks or other damage.

The multilayer ceramic capacitor described in Japanese Patent Laid-Open No. 2015-65394 is 300 μm in thickness in the stacking direction. However, in association with the recent further reduction in size and thickness of electronic devices, multilayer ceramic capacitors are required to be further reduced in thickness. For a multilayer ceramic capacitor having such a reduced thickness, external electrodes may be formed by plating deposition through a metallic medium onto leading portions of internal electrodes. However, the thickness reduction significantly decreases the likelihood that the medium will come into contact with the leading portions. This makes the plating precipitation onto the lateral surfaces difficult.

SUMMARY OF THE INVENTION

Preferred embodiments of the present invention provide multilayer ceramic capacitors each having a reduced thickness and including external electrodes reliably provided thereon by plating deposition.

A multilayer ceramic capacitor according to a preferred embodiment of the present invention includes a stacked body and a plurality of external electrodes. The stacked body includes a plurality of dielectric layers and a plurality of internal electrodes that are stacked in a stacking direction, a first main surface and a second main surface opposite to each other in the stacking direction, a first lateral surface and a second lateral surface opposite to each other in a longitudinal direction orthogonal or substantially orthogonal to the stacking direction, and a third lateral surface and a fourth lateral surface opposite to each other in a width direction orthogonal or substantially orthogonal to the stacking direction and the longitudinal direction, and a plurality of external electrodes disposed on the lateral surfaces of the stacked body. The plurality of internal electrodes include a plurality of first internal electrodes and a plurality of second internal electrodes alternately stacked, with the plurality of dielectric layers interposed therebetween. The plurality of first internal electrodes include first leading portions extending to the first lateral surface and second leading portions extending to the second lateral surface. The plurality of second internal electrodes include third leading portions extending to the first lateral surface and fourth leading portions extending to the second lateral surface. The plurality of external electrodes include a first external electrode connected to the first leading portions and covering the first leading portions exposed at the first lateral surface, the first external electrode covering a portion of each of the first main surface, and the first lateral surface, a second external electrode connected to the second leading portions and covering the second leading portions exposed at the second lateral surface, the second external electrode covering a portion of each of the first main surface, and the second lateral surface, a third external electrode connected to the third leading portions and covering the third leading portions exposed at the first lateral surface, the third external electrode covering a portion of each of the first main surface, and the first lateral surface, and a fourth external electrode connected to the fourth leading portions and covering the fourth leading portions exposed at the second lateral surface, the fourth external electrode covering a portion of each of the first main surface, and the second lateral surface. The plurality of dielectric layers include outer layer portions and an effective layer portion. One of the outer layer portions is located adjacent to the first main surface of the stacked body, and another of the outer layer portions is located adjacent to the second main surface of the stacked body. The one of the outer layer portions is one of the plurality of dielectric layers that is located between the first main surface and one of the plurality of internal electrodes that is closest to the first main surface. The another of the outer layer portions is one of the plurality of dielectric layers that is located between the second main surface and one of the plurality of internal electrodes that is closest to the second main surface. The effective layer portion is a region sandwiched between the outer layer portions. Where a dimension of the stacked body in the stacking direction is denoted by t, and a dimension of the effective layer portion in the stacking direction is denoted by t', a ratio of the dimension t' of the effective layer portion in the stacking direction to the dimension t of the stacked body in the stacking direction is not less than about 53% and not more than about 83%.

The above and other elements, features, steps, characteristics and advantages of the present invention will become more apparent from the following detailed description of the preferred embodiments with reference to the attached drawings.

DETAILED DESCRIPTION OF THE
PREFERRED EMBODIMENTS

1. Multilayer Ceramic Capacitor

Figure 1:
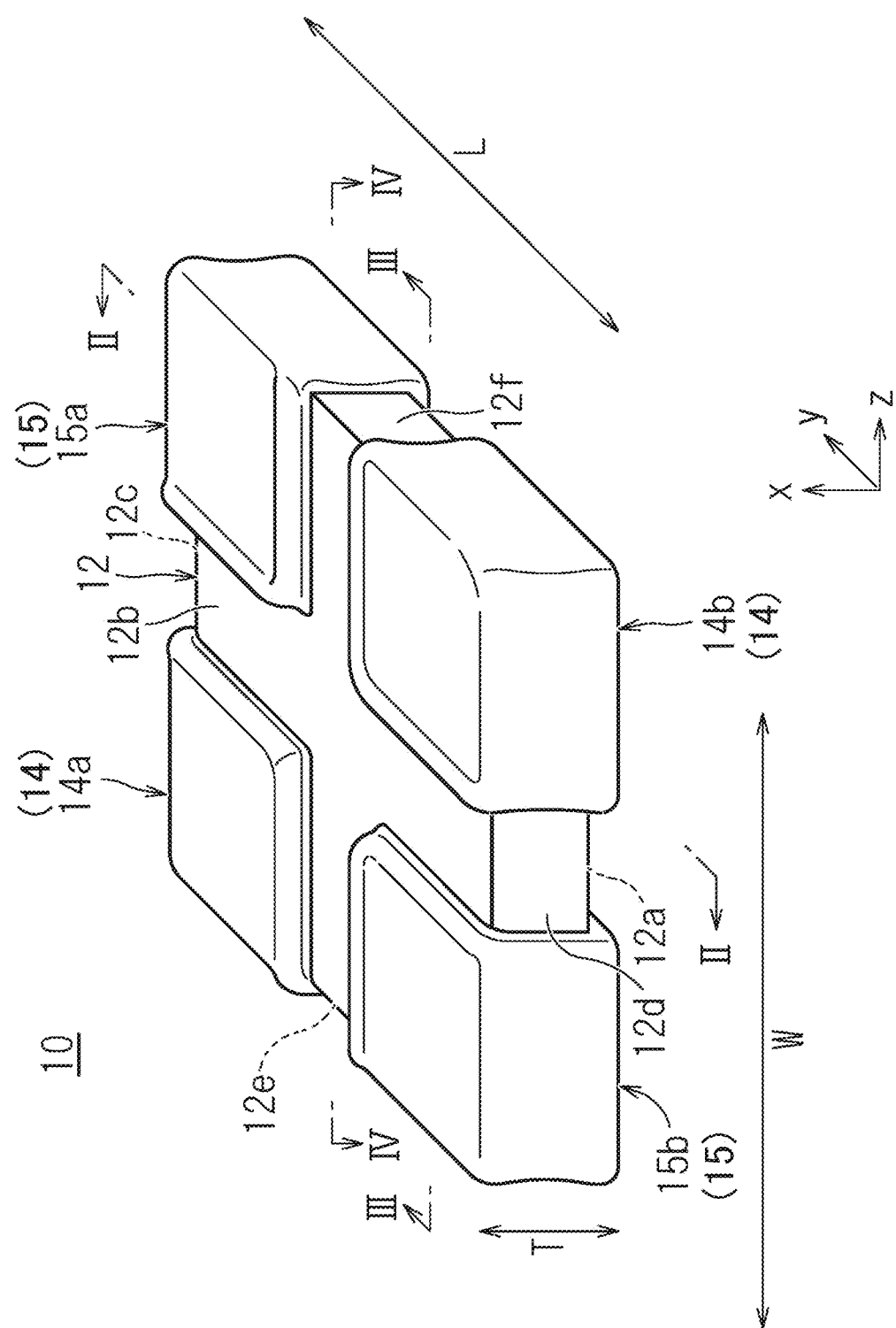
FIG. 1 is an outside perspective view showing an example multilayer ceramic capacitor according to a preferred embodiment of the present invention.
Figure 2:
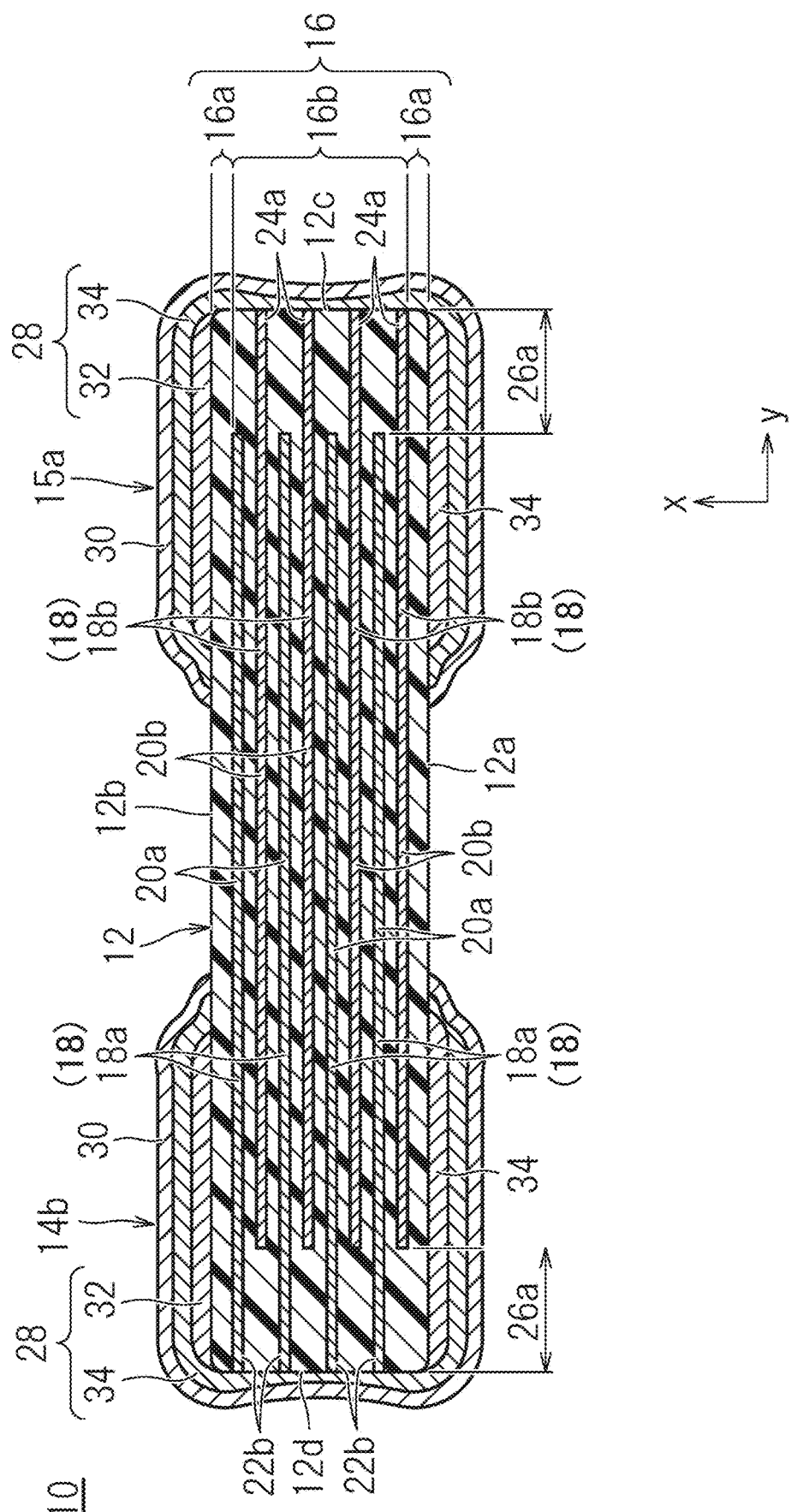
FIG. 2 is a cross-sectional view taken along line II-II of the multilayer ceramic capacitor shown in FIG. 1.
Figure 3:
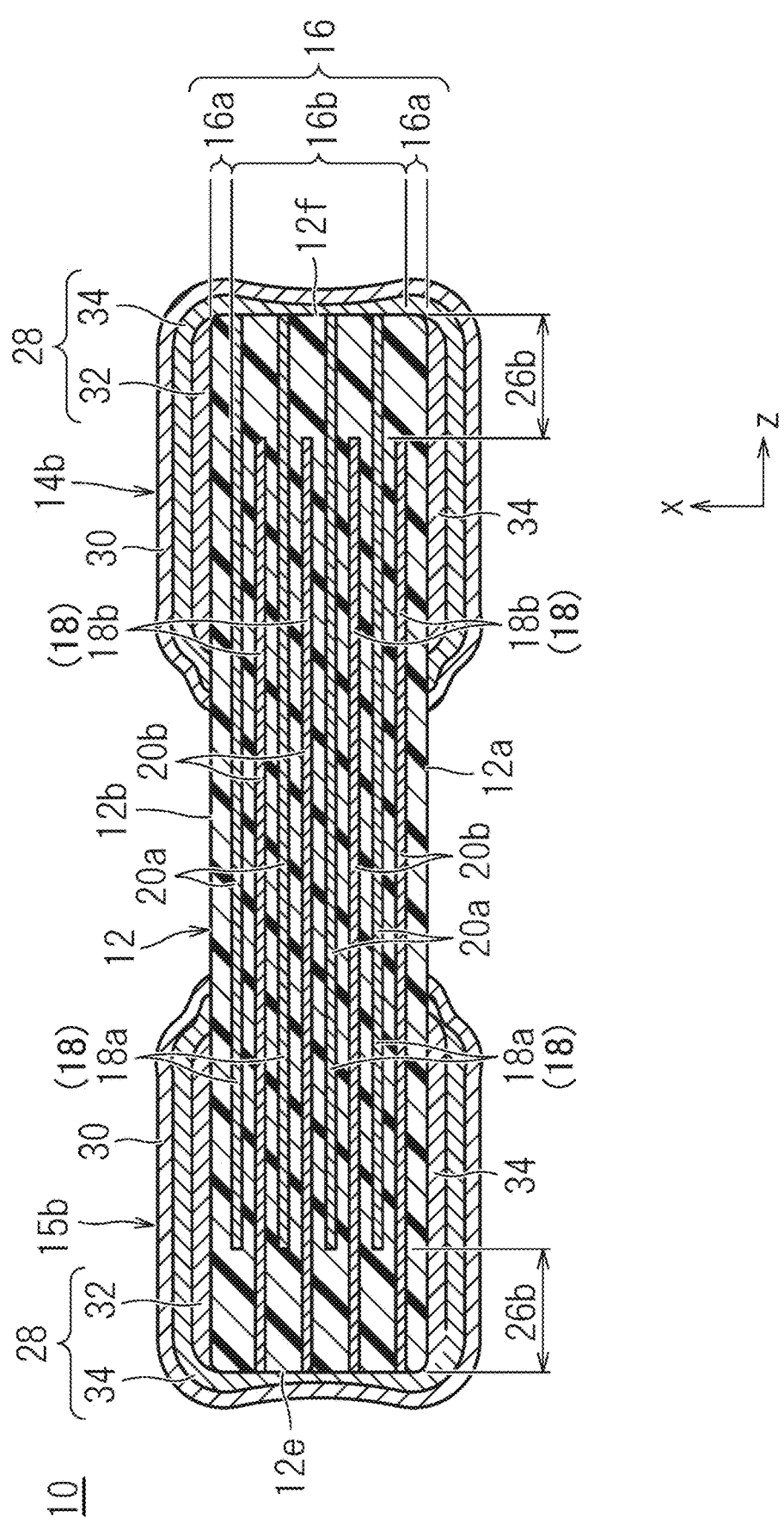
FIG. 3 is a cross-sectional view taken along line III-III of the multilayer ceramic capacitor shown in FIG. 1.
Figure 4:
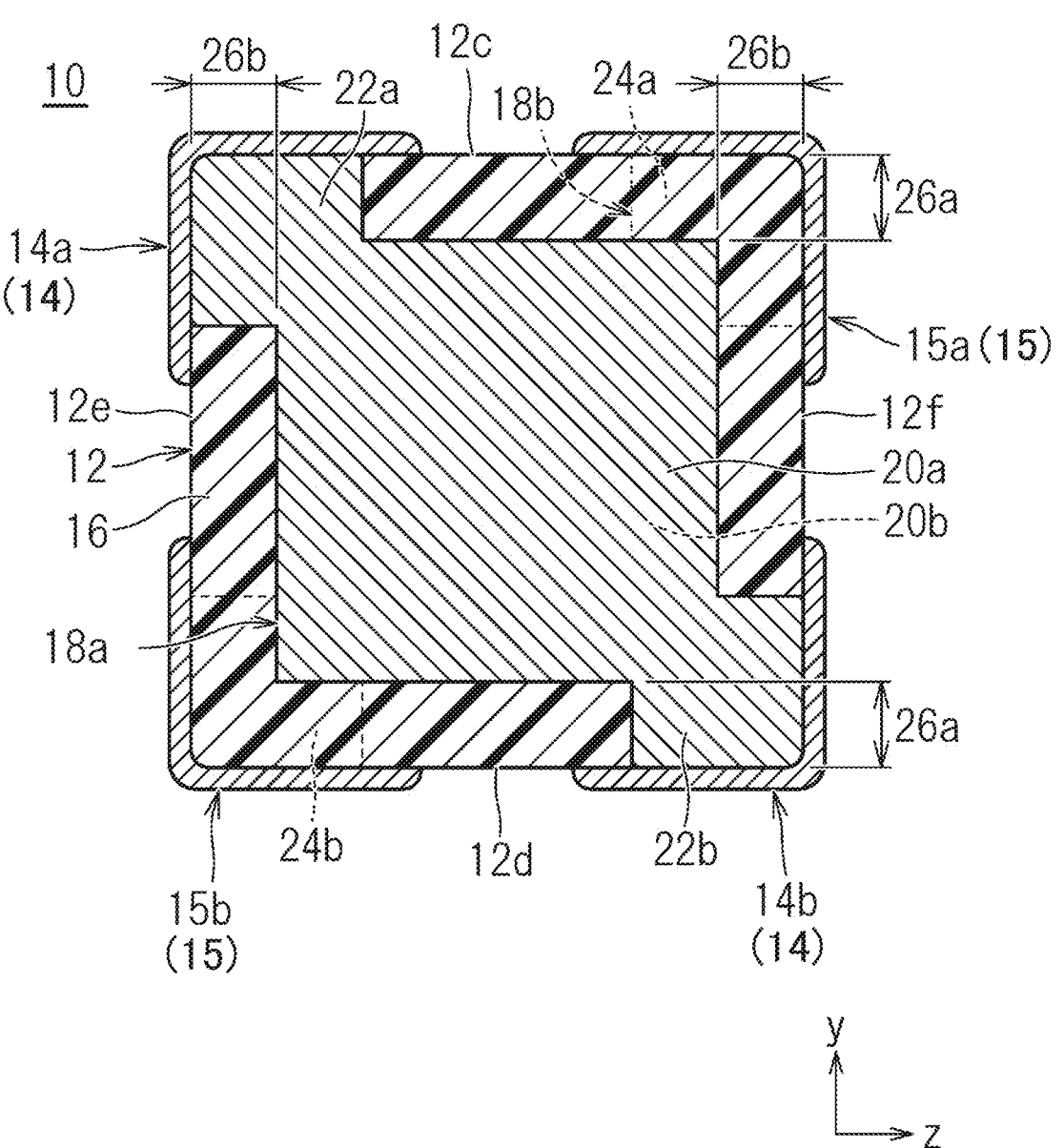
FIG. 4 is a cross-sectional view taken along line IV-IV of the multilayer ceramic capacitor shown in FIG. 1.
Figure 5:
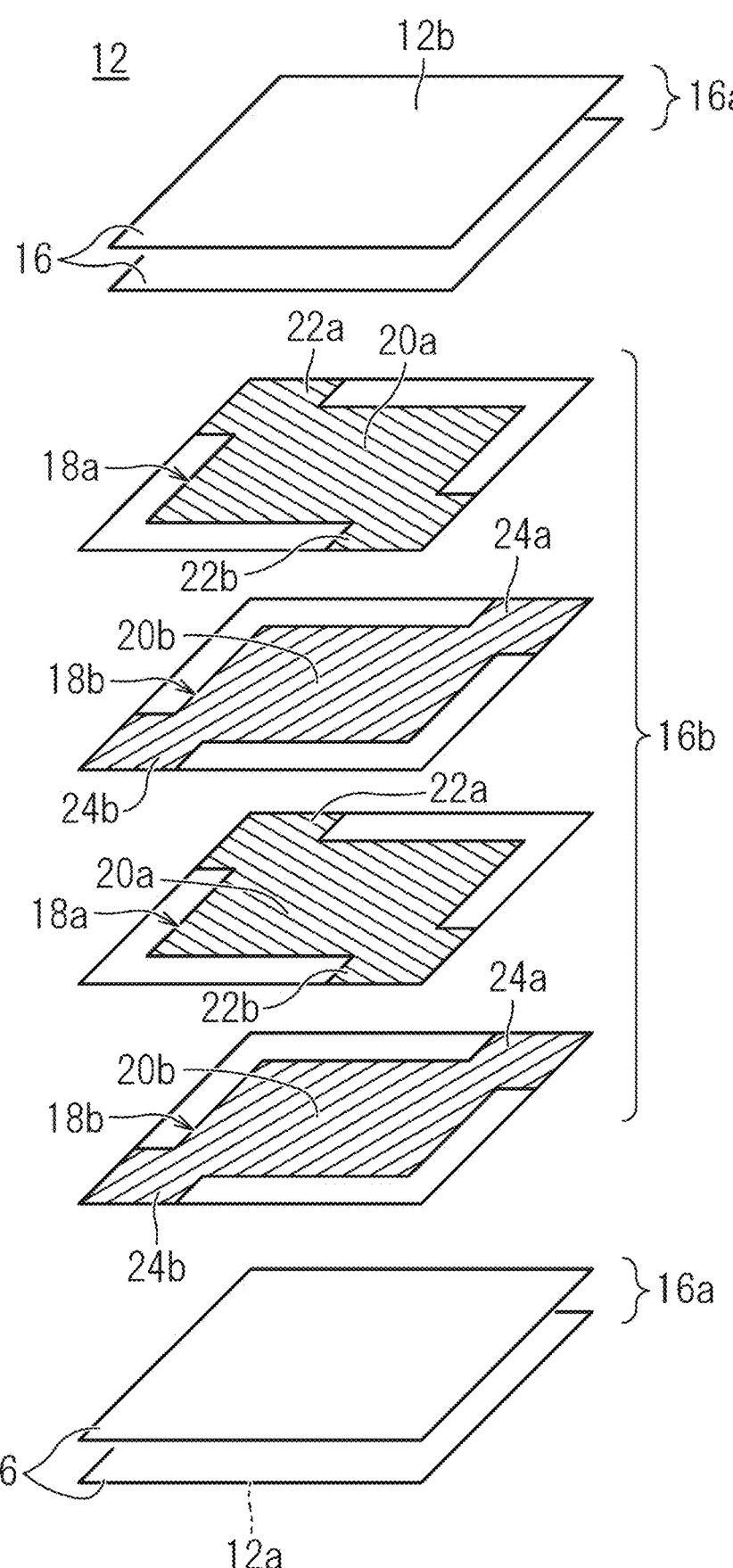
FIG. 5 is an exploded perspective view of the stacked body shown in FIGS. 1 to 4.
Figure 6:
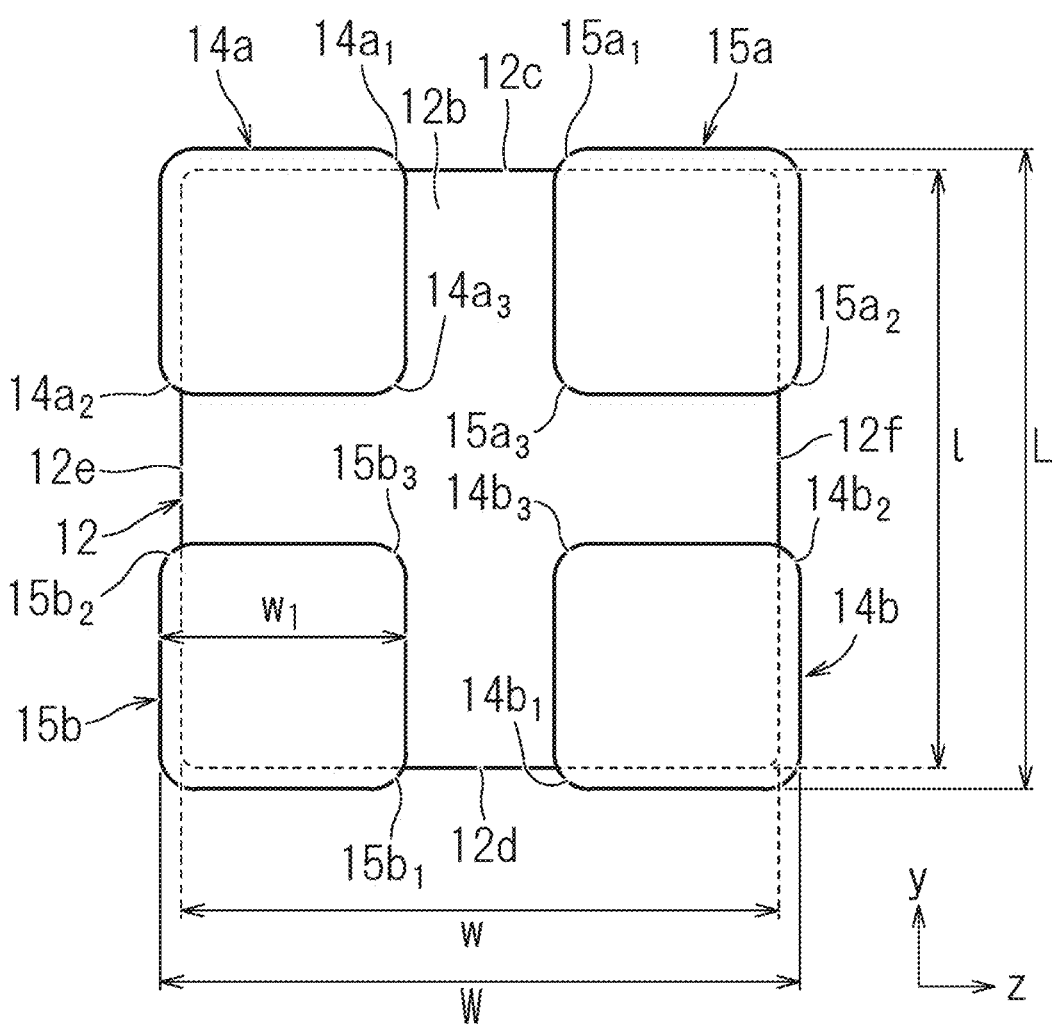
FIG. 6 is a plan view of the multilayer ceramic capacitor shown in FIG. 1.
Figure 7:
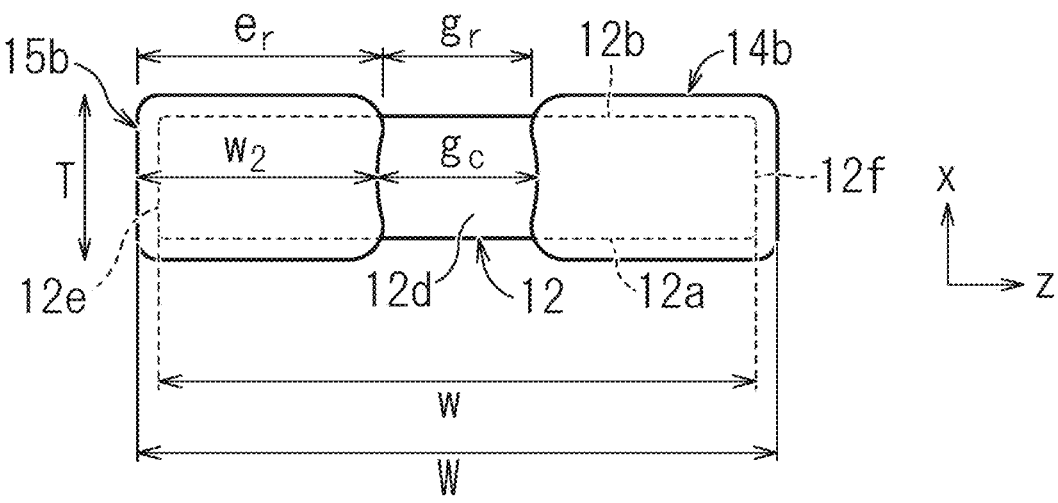
FIG. 7 is a front view of the multilayer ceramic capacitor shown in FIG. 1.
Figure 8:
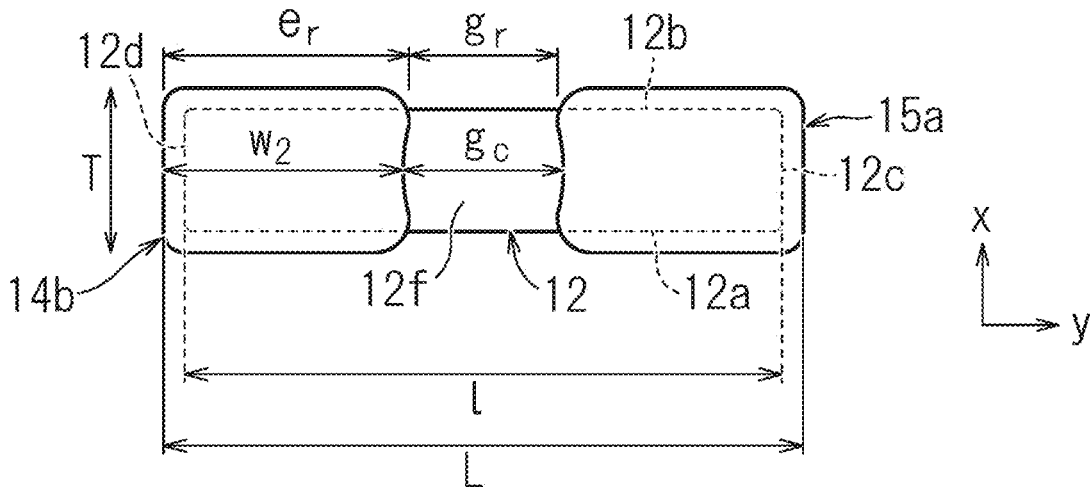
FIG. 8 is a right side view of the multilayer ceramic capacitor shown in FIG. 1.

A multilayer ceramic capacitor according to a first preferred embodiment of the present invention will now be described. FIG. 1 is an outside perspective view showing a first preferred embodiment of a multilayer ceramic capacitor according to the present invention. FIG. 2 is a cross-sectional view taken along line II-II of the multilayer ceramic capacitor shown in FIG. 1. FIG. 3 is a cross-sectional view taken along line III-III of the multilayer ceramic capacitor shown in FIG. 1. FIG. 4 is a cross-sectional view taken along line IV-IV of the multilayer ceramic capacitor shown in FIG. 1. FIG. 5 is an exploded perspective view of the stacked body shown in FIGS. 1 to 4. FIGS. 6, 7 and 8 are respectively a plan view, a front view, and a right side view of the multilayer ceramic capacitor shown in FIG. 1.

A multilayer ceramic capacitor 10 includes a rectangular or substantially rectangular parallelepiped stacked body 12 and external electrodes 14, 15.

Stacked body 12 includes a plurality of dielectric layers 16 and a plurality of internal electrodes 18. Stacked body 12 includes a first main surface 12a and a second main surface 12b opposite to each other in stacking direction x, a first lateral surface 12c and a second lateral surface 12d opposite to each other in longitudinal direction y orthogonal or substantially orthogonal to stacking direction x, and a third lateral surface 12e and a fourth lateral surface 12f opposite to each other in width direction z orthogonal or substantially orthogonal to stacking direction x and longitudinal direction y. Each of first and second main surfaces 12a and 12b extends along longitudinal direction y and width direction z. Each of first and second lateral surfaces 12c and 12d extends along stacking direction x and width direction z. Each of third and fourth lateral surfaces 12e and 12f extends along stacking direction x and longitudinal direction y. Thus, stacking direction x is the direction connecting first and second main surfaces 12a and 12b, longitudinal direction y is the direction connecting first and second lateral surfaces 12c and 12d, and width direction z is the direction connecting third and fourth lateral surfaces 12e and 12f.

The corners and ridge lines of stacked body 12 are preferably rounded. Each corner refers to an intersection of three planes of stacked body 12, and each ridge line refers to an intersection of two planes of stacked body 12.

Dielectric layers 16 include outer layer portions 16a and an effective layer portion 16b. Outer layer portions 16a are located adjacent to first and second main surfaces 12a and 12b of stacked body 12. Specifically, one of the outer layer portions 16a is the dielectric layer 16 located between first main surface 12a and one of internal electrodes 18 that is closest to first main surface 12a, and the other of the outer layer portions 16a is the dielectric layer 16 located between second main surface 12b and one of internal electrodes 18 that is closest to second main surface 12b. Each of outer layer portions 16a preferably has a thickness of not less than about 3 μm and not more than about 12 μm, for example. Effective layer portion 16b is the region sandwiched between both outer layer portions 16a. That is, effective layer portion 16b is the region in which internal electrodes 18 are stacked.

Figure 9:
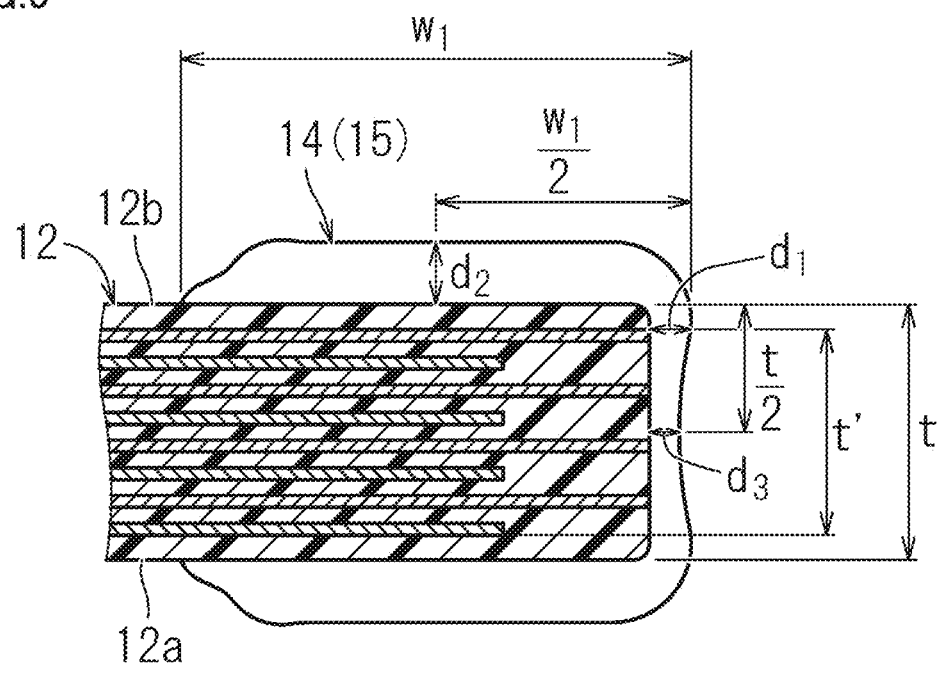
FIG. 9 is an enlarged cross-sectional view showing an external electrode in the cross-sectional view of FIG. 2 or 3 in enlarged view.

As shown in FIG. 9, where the dimension of stacked body 12 in stacking direction x is denoted by t, and the dimension of effective layer portion 16b in stacking direction x is denoted by t', the ratio of dimension t' of effective layer portion 16b in stacking direction x to dimension t of stacked body 12 in stacking direction x preferably satisfies not less than about 53% and not more than about 83%, for example. Dimension t of stacked body 12 in stacking direction x is preferably not less than about 30 μm and not more than about 80 μm, for example. Further, the ratio of the total thickness of both outer layer portions 16a to dimension t' of effective layer portion 16b in stacking direction x is preferably not less than about 21% and not more than about 88%, for example. The ratio of the total thickness of both outer layer portions 16a to dimension t of stacked body 12 in stacking direction x is preferably not less than about 18% and not more than about 47%, for example.

Dielectric layers 16 may be made of, for example, dielectric material. Examples of dielectric materials include dielectric ceramic that includes barium titanate, calcium titanate, strontium titanate, barium calcium titanate, or calcium zirconate, as a primary component. If any of the above-listed dielectric materials is contained as a primary component, secondary components, less in content than the primary component, may be added in accordance with the desired characteristics of multilayer ceramic capacitor 10. Examples of the secondary components include Mg compounds, Mn compounds, Si compounds, Al compounds, V compounds, Ni compounds, and rare-earth compounds.

The average thickness of dielectric layers 16 sandwiched between internal electrodes 18 is preferably, for example, not less than about 0.4 μm and not more than about 1.0 μm, more preferably not less than about 0.4 μm and not more than about 0.8 μm, and still more preferably not less than about 0.4 μm and not more than about 0.6 μm.

In multilayer ceramic capacitor 10, as shown in FIGS. 2 to 5, internal electrodes 18 are alternately stacked, with dielectric layers 16 being interposed therebetween in stacked body 12.

Stacked body 12 includes a plurality of first internal electrodes 18a and a plurality of second internal electrodes 18b, as a plurality of internal electrodes 18. First internal electrodes 18a and second internal electrodes 18b are alternately stacked, with dielectric layers 16 being interposed therebetween.

First internal electrodes 18a are disposed on the surfaces of dielectric layers 16. First internal electrodes 18a include first facing portions 20a facing first and second main surfaces 12a and 12b. First internal electrodes 18a are stacked in the direction connecting first and second main surfaces 12a and 12b.

Second internal electrodes 18b are disposed on the surfaces of dielectric layers 16 other than dielectric layers 16 on which first internal electrodes 18a are disposed. Second internal electrodes 18b include second facing portions 20b facing first and second main surfaces 12a and 12b. Second internal electrodes 18b are stacked in the direction connecting first and second main surfaces 12a and 12b.

First internal electrodes 18a include first leading portions 22a leading to first and third lateral surfaces 12c and 12e of stacked body 12, and second leading portions 22b leading to second and fourth lateral surfaces 12d and 12f of stacked body 12. Thus, first leading portions 22a are exposed at first and third lateral surfaces 12c and 12e of stacked body 12, and second leading portions 22b are exposed at second and fourth lateral surfaces 12d and 12f of stacked body 12. First leading portions 22a exposed at first and third lateral surfaces 12c and 12e of stacked body 12, and second leading portions 22b exposed at second and fourth lateral surfaces 12d and 12f of stacked body 12 are preferably not less than about 135 μm and not more than about 195 μm, for example, in dimension in longitudinal direction y and width direction z. First leading portions 22a and second leading portions 22b preferably have a rectangular or substantially rectangular shape.

Second internal electrodes 18b include third leading portions 24a leading to first and fourth lateral surfaces 12c and 12f of stacked body 12, and fourth leading portions 24b leading to second and third lateral surfaces 12d and 12e of stacked body 12. Thus, third leading portions 24a are exposed at first and fourth lateral surfaces 12c and 12f of stacked body 12, and fourth leading portions 24b are exposed at second and third lateral surfaces 12d and 12e of stacked body 12. Third leading portions 24a exposed at first and fourth lateral surfaces 12c and 12f of stacked body 12, and fourth leading portions 24b exposed at second and third lateral surfaces 12d and 12e of stacked body 12 are preferably not less than about 135 μm and not more than about 195 μm, for example, in dimension in longitudinal direction y and width direction z. Third leading portions 24a and fourth leading portions 24b preferably have a rectangular or substantially rectangular shape.

When multilayer ceramic capacitor 10 is seen in stacking direction x, the straight lines connecting first leading portions 22a and second leading portions 22b of first internal electrodes 18a intersect with the straight lines connecting third leading portions 24a and fourth leading portions 24b of second internal electrodes 18b.

Stacked body 12 includes lateral portions (L gaps) 26a of stacked body 12 defined by one end of first facing portions 20a in longitudinal direction y and first lateral surface 12c, and defined by the other end of second facing portions 20b in longitudinal direction y and second lateral surface 12d. The average dimension of lateral portions (L gaps) 26a of stacked body 12 in longitudinal direction y is preferably, for example, not less than about 10 μm and not more than about 70 μm, more preferably not less than about 10 μm and not more than about 50 μm, and still more preferably not less than about 10 μm and not more than about 30 μm.

Further, stacked body 12 includes lateral portions (W gaps) 26b of stacked body 12 defined by one end of first facing portions 20a in width direction z and third lateral surface 12e, and defined by the other end of second facing portions 20b in width direction z and fourth lateral surface 12f. The average dimension of lateral portions (W gaps) 26b of stacked body 12 in width direction z is preferably, for example, not less than about 10 μm and not more than about 70 μm, more preferably not less than about 10 μm and not more than about 50 μm, still more preferably not less than about 10 μm and not more than about 30 μm.

Examples of the materials of internal electrodes 18 include a metal, such as Ni, Cu, Ag, Pd, or Au, or an alloy including one of these metals, such as an Ag—Pd alloy. Internal electrodes 18 may further include dielectric particles having the same composition as the ceramic included in dielectric layers 16. The number of stacked internal electrodes 18 is preferably not less than about 20 and not more than about 80, for example. The average thickness of internal electrodes 18 is preferably, for example, not less than about 0.3 μm and not more than about 1.0 μm, and more preferably not less than about 0.6 μm and not more than about 1.0 μm.

On first and second lateral surfaces 12c and 12d of stacked body 12, external electrodes 14, 15 are provided.

External electrodes 14 include a first external electrode 14a electrically connected to first leading portions 22a of first internal electrodes 18a, and a second external electrode 14b electrically connected to second leading portions 22b.

First external electrode 14a covers first leading portions 22a exposed at first and third lateral surfaces 12c and 12e, and covers a portion of each of first main surface 12a, second main surface 12b, first lateral surface 12c, and third lateral surface 12e. Second external electrode 14b covers second leading portions 22b exposed at second and fourth lateral surfaces 12d and 12f, and covers a portion of each of first main surface 12a, second main surface 12b, second lateral surface 12d, and fourth lateral surface 12f. First external electrode 14a and second external electrode 14b preferably have a rectangular or substantially rectangular shape on each of main surfaces 12a, 12b.

External electrodes 15 include a third external electrode 15a electrically connected to third leading portions 24a of second internal electrodes 18b, and a fourth external electrode 15b electrically connected to fourth leading portions 24b.

Third external electrode 15a covers third leading portions 24a exposed at first and fourth lateral surfaces 12c and 12f, and covers a portion of each of first main surface 12a, second main surface 12b, first lateral surface 12c, and fourth lateral surface 12f. Fourth external electrode 15b covers fourth leading portions 24b exposed at second and third lateral surfaces 12d and 12e, and covers a portion of each of first main surface 12a, second main surface 12b, second lateral surface 12d, and third lateral surface 12e. Third external electrode 15a and fourth external electrode 15b preferably have a rectangular or substantially rectangular shape on each of main surfaces 12a, 12b.

Curved portions are provided at the corners of external electrodes 14, 15 located at the ridge lines at the boundaries between first and second main surfaces 12a and 12b and lateral surfaces 12c, 12d, 12e, 12f; and at the corners of external electrodes 14, 15 located on first and second main surfaces 12a and 12b. Specifically, as shown in FIG. 6, curved portions $14a_1$, $14a_2$ are provided at the corners of first external electrode 14a located at the ridge lines at the boundaries between first and second main surfaces 12a, 12b and lateral surfaces 12c, 12e; and curved portions 14a3 are provided at the corners of first external electrode 14a located on first and second main surfaces 12a and 12b. Curved portions 14b1, 14b2 are provided at the corners of second external electrode 14b located at the ridge lines at the boundaries between first and second main surfaces 12a, 12b and lateral surfaces 12d, 12f; and curved portions 14b3 are provided at the corners of second external electrode 14b located on first and second main surfaces 12a and 12b. Curved portions $15a_1$, $15a_2$ are provided at the corners of third external electrode 15a located at the ridge lines at the boundaries between first and second main surfaces 12a, 12b and lateral surfaces 12c, 12f; and curved portions $15a_3$ are provided at the corners of third external electrode 15a located on first and second main surfaces 12a and 12b. Curved portions $15b_1$, $15b_2$ are provided at the corners of fourth external electrode 15b located at the boundaries between first and second main surfaces 12a, 12b and lateral surfaces 12d, 12e; and curved portions $15b_3$ are provided at the corners of fourth external electrode 15b located on first and second main surfaces 12a and 12b.

In stacked body 12, first facing portions 20a and second facing portions 20b face each other, with dielectric layers 16 being interposed therebetween, thus causing electrical properties (e.g., capacitance). This provides a capacitance between first and second external electrodes 14a, 14b, to which first internal electrodes 18a are connected, and third and fourth external electrodes 15a and 15b, to which second internal electrodes 18b are connected. With such structure, multilayer ceramic capacitor 10 defines a capacitor.

Each external electrode 14, 15 preferably includes an undercoating electrode layer 28 and a plating layer 30 in this order from the stacked body 12 side. Each undercoating electrode layer 28 includes a main-surface undercoating electrode layer 32 and a lateral-surface undercoating electrode layer 34.

Main-surface undercoating electrode layers 32 are formed on first and second main surfaces 12a and 12b by sputtering, for example, to define sputtered electrodes. Main-surface undercoating electrode layers 32, formed as sputtered electrodes, preferably include Ni, Cr, and Cu, for example. The thickness of the sputtered electrodes in stacking direction x is preferably, for example, not less than about 50 nm and not more than about 400 nm, and more preferably not less than about 50 nm and not more than about 130 nm. Main-surface undercoating electrode layers 32 on first and second main surfaces 12a and 12b may be baked electrode layers. In this case, main-surface undercoating electrode layers 32 are formed by, for example, screen printing with an external electrode paste including, for example, Ni as a primary component. The thickness of the baked electrode layers on the main surfaces in stacking direction x is preferably not less than about 1 μm and not more than about 5 μm, for example.

Lateral-surface undercoating electrode layer 34 is formed as a plated electrode by, for example, Cu plating, continuous with a portion of first and third lateral surfaces 12c and 12e and a portion of first and second main surfaces 12a and 12b, so that lateral-surface undercoating electrode layer 34 covers first leading portions 22a of first internal electrodes 18a exposed at first and third lateral surfaces 12c and 12e of stacked body 12, and also covers main-surface undercoating electrode layers 32. Thus, undercoating electrode layer 28 for first external electrode 14a is formed. Also, lateral-surface undercoating electrode layer 34 is formed as a plated electrode by, for example, Cu plating, continuous with a portion of first and fourth lateral surfaces 12c and 12f and a portion of first and second main surfaces 12a and 12b, so that lateral-surface undercoating electrode layer 34 covers third leading portions 24a of second internal electrodes 18b exposed at first and fourth lateral surfaces 12c and 12f of stacked body 12. Thus, undercoating electrode layer 28 for third external electrode 15a is formed.

In the same or substantially the same manner, lateral-surface undercoating electrode layer 34 is formed as a plated electrode by, for example, Cu plating, continuous with a portion of second and fourth lateral surfaces 12d and 12f and a portion of first and second main surfaces 12a and 12b, so that lateral-surface undercoating electrode layer 34 covers second leading portions 22b of first internal electrodes 18a exposed at second and fourth lateral surfaces 12d and 12f of stacked body 12. Thus, undercoating electrode layer 28 for second external electrode 14b is formed. Also, lateral-surface undercoating electrode layer 34 is formed as a plated electrode by, for example, Cu plating, continuous with a portion of second and third lateral surfaces 12d and 12e and a portion of first and second main surfaces 12a and 12b, so that lateral-surface undercoating electrode layer 34 covers fourth leading portions 24b of second internal electrodes 18b exposed at second and third lateral surfaces 12d and 12e of stacked body 12. Thus, undercoating electrode layer 28 for fourth external electrode 15b is formed.

Plating layer 30 preferably includes, for example, at least one selected from the group consisting of Ni, Sn, Cu, Ag, Pd, Ag—Pd alloy, and Au. Plating layer 30 may include a plurality of layers. If the multilayer ceramic capacitor is to be mounted on a substrate surface, plating layer 30 preferably has a double-layer structure including a Ni plating layer and a Sn plating layer. The Ni plating layer can prevent undercoating electrode layer 28 from being eroded by solder when multilayer ceramic capacitor 10 is mounted. The Sn plating layer improves the solder wettability when multilayer ceramic capacitor 10 is mounted, thus allowing easy mounting. A Cu plating layer may be interposed between undercoating electrode layer 28 and the Ni plating layer. If the multilayer ceramic capacitor is to be embedded into a substrate, plating layer 30 preferably has a single-layer structure including a Cu plating layer.

The average thickness of the Ni plating layer is preferably not less than about 2 μm and not more than about 4 μm, for example. The average thickness of the Sn plating layer is preferably not less than about 2 μm and not more than about 4 μm, for example. The average thickness of the Cu plating layer is preferably not less than about 5 μm and not more than about 8 μm, for example.

The dimension of multilayer ceramic capacitor 10 in longitudinal direction y is referred to as dimension L. The dimension of multilayer ceramic capacitor 10 in stacking direction x, including stacked body 12 and external electrodes 14, 15, is referred to as dimension T. The dimension of multilayer ceramic capacitor 10 in width direction z, including stacked body 12 and external electrodes 14, 15, is referred to as dimension W.

When dimension L of multilayer ceramic capacitor 10 in longitudinal direction y is compared with dimension W in width direction z, about $0.85 \leq W/L \leq$ about 1, and L$\leq$about 750 μm, for example, are preferably satisfied. If dimension L is larger than this, the flexural strength will decrease.

Dimension T of multilayer ceramic capacitor 10 in stacking direction x preferably satisfies, for example, about 50 μm$\leq$T$\leq$about 110 μm. Dimension T being less than about 50 μm is not preferred because it would increase the warpage of the stacked body at the time of firing and thus reduce the flexural strength. Dimension T being more than about 110 μm is not preferred as a thin multilayer ceramic capacitor.

The edges defining first, second, third, and fourth external electrodes 14a, 14b, 15a, and 15b located on first or second main surface 12a or 12b of stacked body 12 are preferably parallel or substantially parallel to the long edges of stacked body 12.

As shown in FIGS. 6 and 7, $w_1 > e_r$ is preferably satisfied, where $w_1$ denotes the maximum dimension of external electrodes 14, 15 located on first and second main surfaces 12a and 12b in longitudinal direction y or width direction z, and $e_r$ denotes the dimension of external electrodes 14, 15 located at the ridge lines at the boundaries between first or second main surface 12a or 12b and lateral surfaces 12c, 12d, 12e, 12f.

As shown in FIGS. 6 and 7, $w_1 \geq w_2$ is preferably satisfied, where $w_1$ denotes the maximum dimension of external electrodes 14, 15 located on first and second main surfaces 12a and 12b in longitudinal direction y or width direction z, and $w_2$ denotes the dimension of external electrodes 14, 15 located on first, second, third, and fourth lateral surfaces 12c, 12d, 12e, and 12f in longitudinal direction y or width direction z.

As shown in FIGS. 7 and 8, the ratio of the shortest of the dimensions $g_r$ and $g_c$ (g-dimension) to dimension l or w is preferably not less than about 17% and not more than about 50%, for example, where $g_r$ denotes the dimension of a portion between adjacent external electrodes 14 and 15, at the ridge lines at the boundaries between the main surfaces and lateral surfaces; $g_c$ denotes the dimension of stacked body 12 at the ½ position (i.e., the center) in the stacking direction, between adjacent external electrodes 14 and 15; l denotes the dimension of stacked body 12 in longitudinal direction y; and w denotes the dimension of stacked body 12 in width direction z.

As shown in FIGS. 7 and 8, the ratio of $e_r$ to dimension l or w ($e_r/l$ or $e_r/w$) is preferably not less than about 25% and not more than about 45%, for example, where $e_r$ denotes the dimension of external electrodes 14, 15 located at the ridge lines at the boundaries between the main surfaces and lateral surfaces, l denotes the dimension of stacked body 12 in longitudinal direction y, and w denotes the dimension of stacked body 12 in width direction z.

As shown in FIG. 9, $d_3 \leq d_2 \leq d_1$ is preferably satisfied, where $d_1$ denotes the thickness of external electrodes 14, 15 in longitudinal direction y or width direction z in the same plane as internal electrode 18 located closest to first or second main surface 12a or 12b; $d_2$ denotes the thickness of external electrodes 14, 15 in stacking direction x, at the ½ position in longitudinal direction y or width direction z, located on first or second main surface 12a or 12b; and $d_3$ denotes the thickness of external electrodes 14, 15 in longitudinal direction y or width direction z, at the ½ position in stacking direction x, located on first, second, third, and fourth lateral surfaces 12c, 12d, 12e, and 12f.

Figure 10:
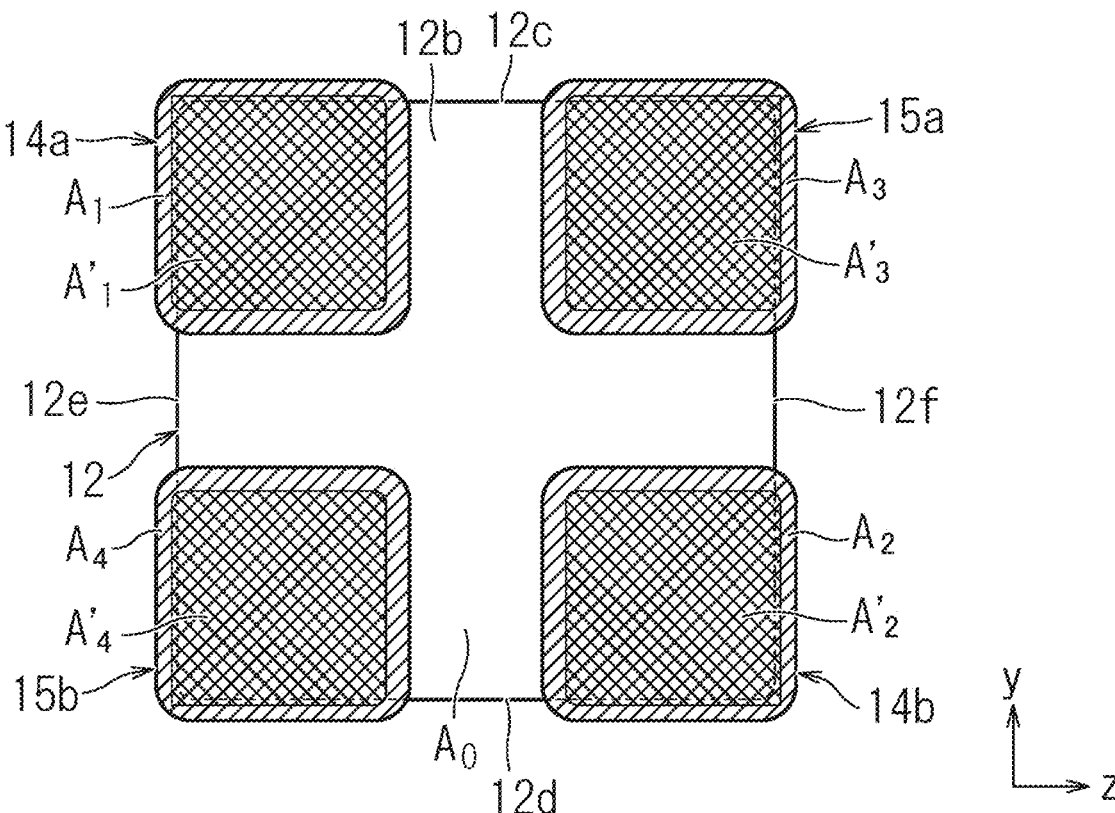
FIG. 10 is a plan view of the multilayer ceramic capacitor shown in FIG. 1, indicating the locations of the surface areas of the external electrodes.

As shown in FIG. 10, the ratio of min [$A_1$, $A_2$, $A_3$, $A_4$] to max [$A_1$, $A_2$, $A_3$, $A_4$] is preferably, for example, not less than about 36% and not more than about 100%, and more preferably not more than about 90%, where $A_1$, $A_2$, $A_3$, and $A_4$ respectively denote the surface areas of first, second, third, and fourth external electrodes 14a, 14b, 15a, and 15b that are located on first or second main surface 12a or 12b of stacked body 12.

Assuming that each of dimensions l and w of stacked body 12 is about 600 μm, each of surface areas $A_1$, $A_2$, $A_3$, and $A_4$ of respective first, second, third, and fourth external electrodes 14a, 14b, 15a, and 15b that are located on first or second main surface 12a or 12b of stacked body 12 is preferably not less than about 22500 μm² and not more than about 62500 μm², for example.

Further, assuming that each of dimensions l and w of stacked body 12 is about 600 μm, and that the surface portions of first, second, third, and fourth external electrodes 14a, 14b, 15a, and 15b located on first or second main surface 12a or 12b of stacked body 12 are translated and superimposed on one another, the area that does not overlap is preferably, for example, not less than about 0 μm² and not more than about 40000 μm², and more preferably not less than about 4000 μm².

As shown in FIG. 10, the ratio of surface area $A_1'$ to surface area $A_1$ of first external electrode 14a, the ratio of surface area $A_2'$ to surface area $A_2$ of second external electrode 14b, the ratio of surface area $A_3'$ to surface area $A_3$ of third external electrode 15a, and the ratio of surface area $A_4'$ to surface area $A_4$ of fourth external electrode 15b are each preferably, for example, not less than about 75%, where surface area $A_1'$ is the surface area of a region having a height of about 5 μm or less from the maximum height of bumps on the surface portion of first external electrode 14a located on first or second main surface 12a or 12b, surface area $A_2'$ is the surface area of a region having a height of about 5 μm or less from the maximum height of bumps on the surface portion of second external electrode 14b located on first or second main surface 12a or 12b, surface area $A_3'$ is the surface area of a region having a height of about 5 μm or less from the maximum height of bumps on the surface portion of third external electrode 15a located on first or second main surface 12a or 12b, and surface area $A_4'$ is the surface area of a region having a height of about 5 μm or less from the maximum height of bumps on the surface portion of fourth external electrode 15b located on first or second main surface 12a or 12b.

Figure 11:
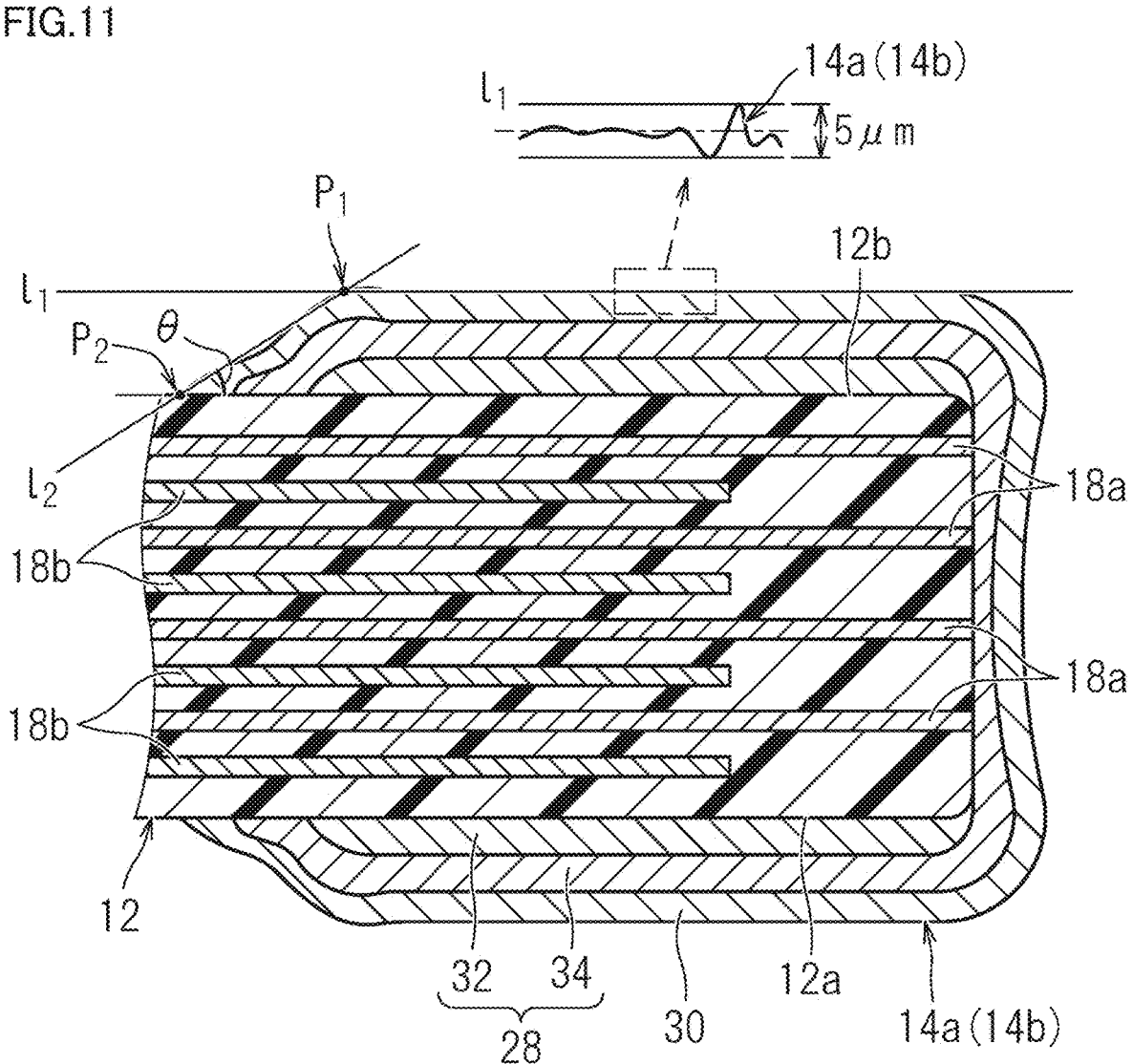
FIG. 11 is an enlarged cross-sectional view showing the state of the e-dimension end at the surface portion of an external electrode located on the main surfaces.

Further, as shown in FIG. 11, angle θ formed by the surface of stacked body 12 and straight line $l_2$ is preferably not less than about 8° and not more than about 37°, for example, where $P_1$ denotes the intersection point between the inclined edge that defines the e-dimension end of external electrode 14, 15, and straight line $l_1$ that is parallel to the surface of stacked body 12 and that passes through the maximum height of bumps on the surface part of external electrode 14, 15 located on first or second main surface 12a or 12b; $P_2$ denotes the e-dimension end of external electrode 14, 15; and $l_2$ denotes the straight line connecting intersection point $P_1$ and e-dimension end $P_2$.

In multilayer ceramic capacitor 10 shown in FIG. 1, where the dimension of stacked body 12 in stacking direction x is denoted by t, and the dimension of effective layer portion 16b in stacking direction x is denoted by t', the ratio of dimension t' of effective layer portion 16b in stacking direction x to dimension t of stacked body 12 in stacking direction x preferably satisfies not less than about 53% and not more than about 83%, for example. This provides multilayer ceramic capacitor 10 with a reduced thickness and including external electrodes reliably provided thereon by plating deposition.

Further, in multilayer ceramic capacitor 10 shown in FIG. 1, dimension t of stacked body 12 in stacking direction x may preferably be, for example, not less than about 30 μm and not more than about 80 μm. This provides multilayer ceramic capacitor 10 including external electrodes further reliably provided thereon by plating deposition.

Further, in multilayer ceramic capacitor 10 shown in FIG. 1, first leading portions 22a exposed at first and third lateral surfaces 12c and 12e of stacked body 12, and second leading portions 22b exposed at second and fourth lateral surfaces 12d and 12f of stacked body 12 may preferably be, for example, not less than about 135 μm and not more than about 195 μm in dimension in longitudinal direction y and width direction z. Also, third leading portions 24a exposed at first and fourth lateral surfaces 12c and 12f of stacked body 12, and fourth leading portions 24b exposed at second and third lateral surfaces 12d and 12e of stacked body 12 may preferably be, for example, not less than about 135 μm and not more than about 195 μm in dimension in longitudinal direction y and width direction z. This provides multilayer ceramic capacitor 10 including external electrodes reliably formed thereon by plating deposition.

In multilayer ceramic capacitor 10 shown in FIG. 1, the ratio of the total thickness of both outer layer portions 16a to dimension t' of effective layer portion 16b in stacking direction x may preferably be, for example, not less than about 21% and not more than about 88%. This provides multilayer ceramic capacitor 10 including external electrodes further reliably provided thereon by plating deposition.

Further, the ratio of the total thickness of both outer layer portions 16a to dimension t of stacked body 12 in stacking direction x may preferably be, for example, not less than about 18% and not more than about 47%. This provides multilayer ceramic capacitor 10 including external electrodes further reliably provided thereon by plating deposition.

Further, in multilayer ceramic capacitor 10 shown in FIG. 1, first internal electrodes 18a include first leading portions 22a leading to first and third lateral surfaces 12c and 12e of stacked body 12, and second leading portions 22b leading to second and fourth lateral surfaces 12d and 12f of stacked body 12. Also, second internal electrodes 18b include third leading portions 24a leading to first and fourth lateral surfaces 12c and 12f of stacked body 12, and fourth leading portions 24b leading to second and third lateral surfaces 12d and 12e of stacked body 12. Accordingly, when a voltage is applied, the currents flowing through the leading portions are directed in opposite directions. This advantageously reduces the equivalent series inductance (ESL), which is a parasitic component of the multilayer ceramic capacitor.

2. Method for Manufacturing Multilayer Ceramic Capacitor

A non-limiting example of a method for manufacturing multilayer ceramic capacitor 10 will now be described.

First, ceramic green sheets and a conductive paste for internal electrodes are prepared. The ceramic green sheets and the conductive paste for internal electrodes include binders (e.g., known organic binders) and solvents (e.g., organic solvents).

Figures 12A, 12B, 13:
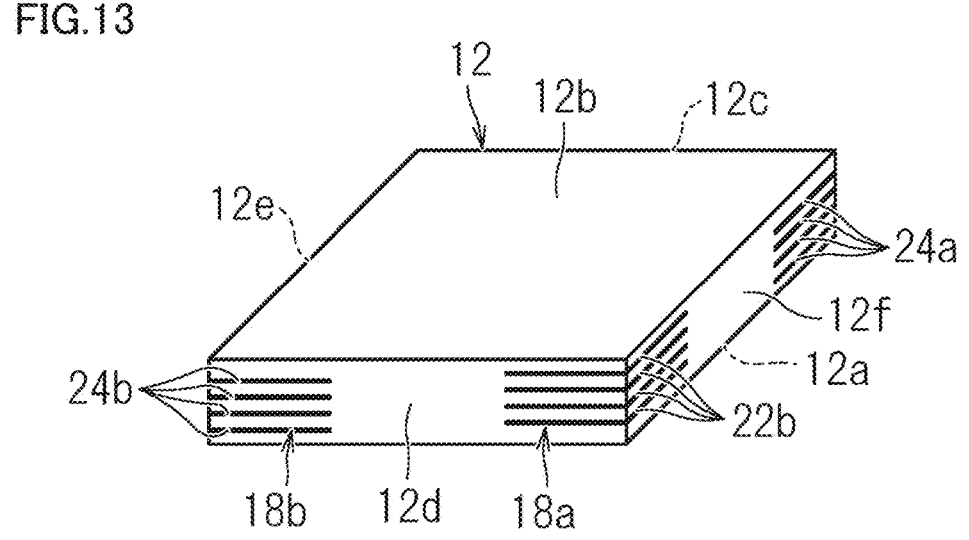
FIG. 12A shows a first internal electrode pattern of the multilayer ceramic capacitor shown in FIG. 1.
FIG. 12B shows a second internal electrode pattern of the multilayer ceramic capacitor shown in FIG. 1.
FIG. 13 is an outside perspective view of the stacked body of the multilayer ceramic capacitor in FIG. 1.

Next, the ceramic green sheets are printed with the conductive paste in a predetermined pattern by, for example, gravure printing, to form internal electrode patterns as shown in FIGS. 12A and 12B. Specifically, the ceramic green sheets are applied with a paste including conductive material by gravure printing for example, thus producing conductive paste layers. The paste including conductive material is preferably, for example, metallic powder with an organic binder and an organic solvent added thereto. Ceramic green sheets with no internal electrode pattern are also produced for external layers.

Using the ceramic green sheets with internal electrode pattern, stacked sheets are produced. Specifically, stacked sheets are produced by laying a ceramic green sheet with no internal electrode pattern; then alternately laying thereon ceramic green sheets with the internal electrode pattern corresponding to first internal electrodes 18a as shown in FIG. 12A, and ceramic green sheets with the internal electrode pattern corresponding to second internal electrodes 18b as shown in FIG. 12B; and further laying thereon a ceramic green sheet with no internal electrode pattern. Then, the stacked sheets are pressure-bonded in stacking direction x by, for example, isostatic press, to thus produce a stacked body block.

Further, the stacked sheets are pressed in the stacking direction by, for example, isostatic press, thus producing a multilayer block.

Then, the multilayer block is cut into pieces having a predetermined size, thus producing multilayer chips. At this time, the corners and ridge lines of each multilayer chip may be rounded by barrel polishing, for example.

Next, the multilayer chip is fired, thus producing stacked body 12 as shown in FIG. 13. The firing temperature is preferably not less than about 900° C. and not more than about 1300° C., for example, though depending on the materials of the ceramic and internal electrodes.

At this time, as shown in FIG. 13, first leading portions 22a of first internal electrodes 18a are exposed at first and third lateral surfaces 12c and 12e of stacked body 12, and second leading portions 22b of first internal electrodes 18a are exposed at second and fourth lateral surfaces 12d and 12f of stacked body 12. In the same or substantially the same manner, third leading portions 24a of second internal electrodes 18b are exposed at first and fourth lateral surfaces 12c and 12f of stacked body 12, and fourth leading portions 24b of second internal electrodes 18b are exposed at second and third lateral surfaces 12d and 12e of stacked body 12.

Figures 14, 15:
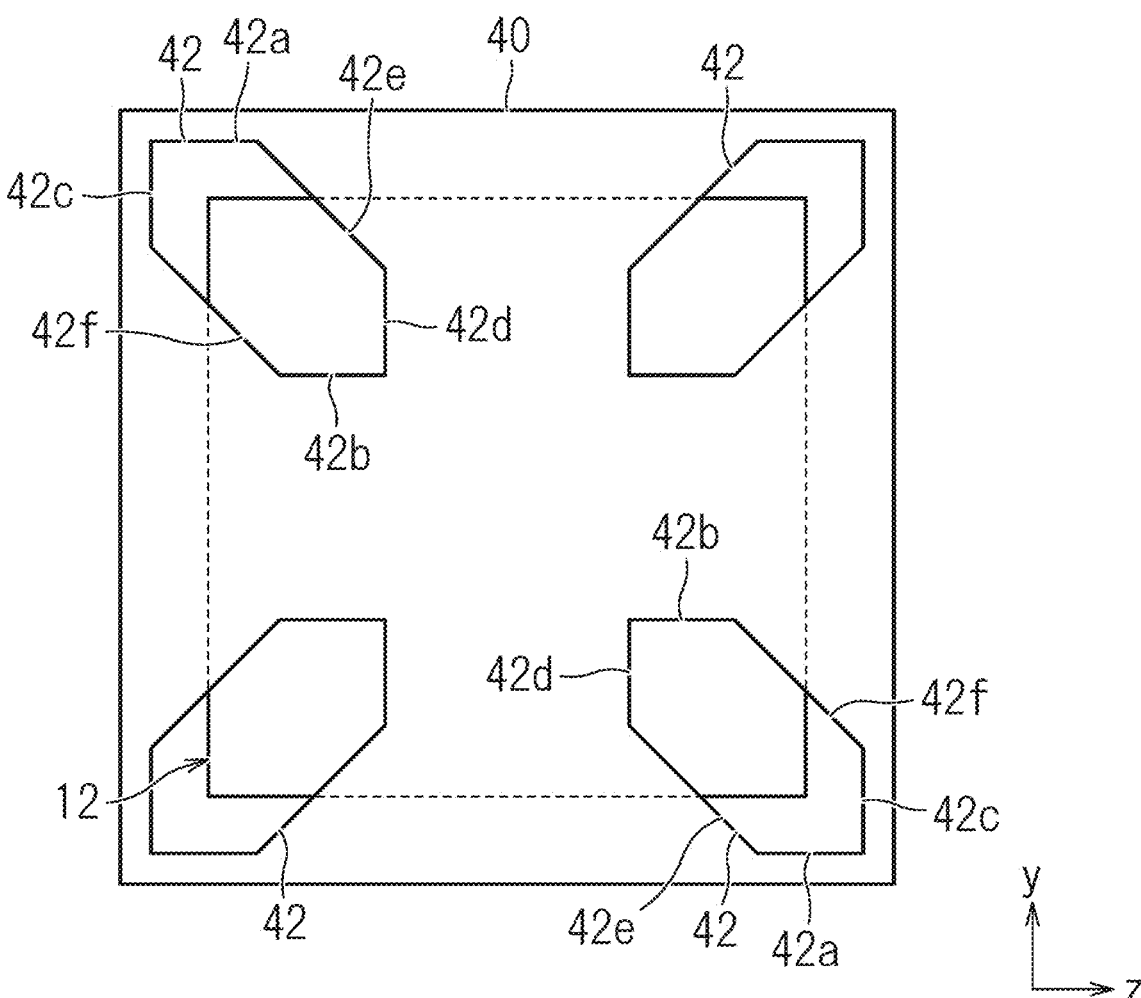
FIG. 14 is an outside perspective view of a product obtained by forming main-surface undercoating electrode layers on the stacked body in FIG. 13.
FIG. 15 is a plan view showing the state in which a sputtering mask used in manufacturing a multilayer ceramic capacitor according to a preferred embodiment of the present invention is aligned with the stacked body.

Then, external electrodes 14, 15 are formed on stacked body 12. Specifically, as shown in FIG. 14, main-surface undercoating electrode layer 32, including a Ni—Cu alloy as a primary component, is formed by sputtering on each of first and second main surfaces 12a and 12b, to form lateral-surface undercoating electrode layer 34 that will cover first leading portions 22a of first internal electrodes 18a. Also, main-surface undercoating electrode layer 32, including a Ni—Cu alloy as a primary component, is formed by sputtering on each of first and second main surfaces 12a and 12b, to form lateral-surface undercoating electrode layer 34 that will cover third leading portions 24a of second internal electrodes 18b. At this time, little or none of the material extends around the lateral surfaces.

In the same or substantially the same manner, main-surface undercoating electrode layer 32, including a Ni—Cu alloy as a primary component, is formed by sputtering on each of first and second main surfaces 12a and 12b, to form lateral-surface undercoating electrode layer 34 that will cover second leading portions 22b of first internal electrodes 18a. Also, main-surface undercoating electrode layer 32, including a Ni—Cu alloy as a primary component, is formed by sputtering on each of first and second main surfaces 12a and 12*b*, to form lateral-surface undercoating electrode layer 34 that will cover fourth leading portions 24*b* of second internal electrodes 18*b*. At this time, little or none of the material extends around the lateral surfaces.

In order to form main-surface undercoating electrode layers 32 by sputtering, a sputtering mask 40 as shown in FIG. 15 is used. Sputtering mask 40 includes four aperture patterns 42 to form main-surface undercoating electrode layers 32. Sputtering mask 40 is slightly larger than the outer shape of stacked body 12. Sputtering mask 40 is positioned so that the corners of stacked body 12 are exposed through respective aperture patterns 42 of sputtering mask 40 placed on the upper side of stacked body 12.

Each aperture pattern 42 preferably has a hexagonal shape. Sputtering mask 40 is placed on stacked body 12 so that, in each aperture pattern 42, opposite edges 42*a* and 42*b* are parallel or substantially parallel to width direction z of stacked body 12, opposite edges 42*c* and 42*d* are parallel or substantially parallel to longitudinal direction y of stacked body 12, and opposite edges 42*e* and edge 42*f* are parallel or substantially parallel to the diagonal direction of stacked body 12.

Figure 16:
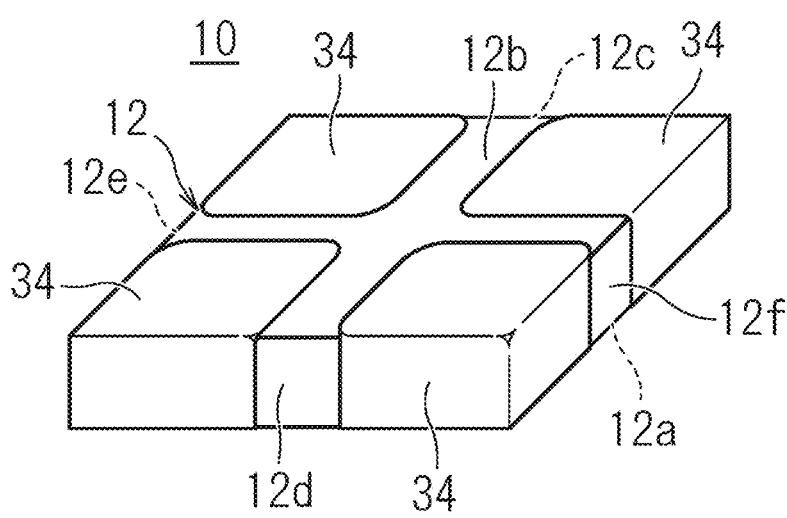
FIG. 16 is an outside perspective view of a product obtained by providing lateral-surface undercoating electrode layers on the stacked body in FIG. 14 on which main-surface undercoating electrode layers have been provided.

Then, as shown in FIG. 16, lateral-surface undercoating electrode layer 34 is formed as a plated electrode by, for example, Cu plating, continuous with a portion of first and third lateral surfaces 12*c* and 12*e* and a portion of first and second main surfaces 12*a* and 12*b*, so that lateral-surface undercoating electrode layer 34 covers first leading portions 22*a* of first internal electrodes 18*a* exposed at first and third lateral surfaces 12*c* and 12*e* of stacked body 12, and also covers main-surface undercoating electrode layers 32. Thus, undercoating electrode layer 28 for first external electrode 14*a* is formed. Also, lateral-surface undercoating electrode layer 34 is formed as a plated electrode by, for example, Cu plating, continuous with a portion of first and fourth lateral surfaces 12*c* and 12*f* and a portion of first and second main surfaces 12*a* and 12*b*, so that lateral-surface undercoating electrode layer 34 covers third leading portions 24*a* of second internal electrodes 18*b* exposed at first and fourth lateral surfaces 12*c* and 12*f* of stacked body 12. Thus, undercoating electrode layer 28 for third external electrode 15*a* is formed.

In the same or substantially the same manner, lateral-surface undercoating electrode layer 34 is formed as a plated electrode by, for example, Cu plating, continuous with a portion of second and fourth lateral surfaces 12*d* and 12*f* and a portion of first and second main surfaces 12*a* and 12*b*, so that lateral-surface undercoating electrode layer 34 covers second leading portions 22*b* of first internal electrodes 18*a* exposed at second and fourth lateral surfaces 12*d* and 12*f* of stacked body 12. Thus, undercoating electrode layer 28 for second external electrode 14*b* is formed. Also, lateral-surface undercoating electrode layer 34 is formed as a plated electrode by, for example, Cu plating, continuous with a portion of second and third lateral surfaces 12*d* and 12*e* and a portion of first and second main surfaces 12*a* and 12*b*, so that lateral-surface undercoating electrode layer 34 covers fourth leading portions 24*b* of second internal electrodes 18*b* exposed at second and third lateral surfaces 12*d* and 12*e* of stacked body 12. Thus, undercoating electrode layer 28 for fourth external electrode 15*b* is formed.

Then, plating layer 30 is formed to cover the surface of each lateral-surface undercoating electrode layer 34. At this time, for example, a Cu plating layer, a Ni plating layer, and a Sn plating layer are formed in sequence, thus producing plating layer 30. The process of forming each plating layer may be performed a plurality of times.

Thus, multilayer ceramic capacitor 10 as shown in FIG. 1 is manufactured.

The advantageous effects of the multilayer ceramic capacitor produced in the above-described manner will be apparent from the following experimental examples.

3. Experimental Examples

The following describes example experiments conducted by the inventor of preferred embodiments of the present invention for the purpose of confirming the magnitude relationship between the stacking-direction thicknesses of the effective layer portion, the outer layer portions, and the stacked body of the multilayer ceramic capacitor in the present invention, and confirming the formation state of the external electrodes.

As experimental examples, samples of multilayer ceramic capacitors were produced in accordance with the method for manufacturing multilayer ceramic capacitors described in the above preferred embodiment.

Common specifications of the multilayer ceramic capacitors in the experimental examples were as follows.
Material of dielectric layers:
Primary component: Barium titanate
Secondary components: Mg, V, Dy, Si
Material of internal electrodes: Ni
Configuration of external electrodes:
Rectangular electrodes were provided on each main surface As shown in FIG. 9, the dimension of stacked body 12 in stacking direction x is denoted by t, and the dimension of effective layer portion 16*b* in stacking direction x is denoted by t'.

In the experimental examples, samples as shown in Table 1 were prepared. In the samples of sample numbers 1 and 2, the thickness (t) of stacked body 12 in stacking direction x was both about 30 μm, and the thickness of each outer layer portion was about 12 μm and about 7 μm, respectively. In the samples of sample numbers 3 to 5, the thickness (t) of stacked body 12 in stacking direction x was all about 57 μm, and the thickness of each outer layer portion was about 12 μm, about 10 μm and about 7 μm, respectively. In the samples of sample numbers 6 and 7, the thickness (t) of stacked body 12 in stacking direction x was both about 80 μm, and the thickness of each outer layer portion was about 12 μm and about 7 μm, respectively. For each prepared sample, a thickness of each outer layer portion necessary for the thickness (t) of stacked body 12 in stacking direction x is shown.

For each sample, the ratio of dimension t' of effective layer portion 16*b* in stacking direction x to dimension t of stacked body 12 in stacking direction x, the ratio of the total thickness of both outer layer portions 16*a* to dimension t' of effective layer portion 16*b* in stacking direction x, and the ratio of the total thickness of both outer layer portions 16*a* to dimension t of stacked body 12 in stacking direction x were calculated. The results are shown in table 1.

TABLE 1

| SPECIMEN NUMBER | 1 | 2 | 3 | 4 | 5 | 6 | 7 |
|---|---|---|---|---|---|---|---|
| DIMENSION OF STACKED BODY: t (μm) | 30 | 30 | 57 | 57 | 57 | 80 | 80 |
| THICKNESS OF EFFECTIVE LAYER PORTION: t' (μm) | 6 | 16 | 33 | 37 | 43 | 56 | 66 |
| THICKNESS OF OUTER LAYER PORTION (μm) | 12 | 7 | 12 | 10 | 7 | 12 | 7 |
| RATIO OF t' TO t (%) | 20 | 53 | 58 | 65 | 75 | 70 | 83 |
| RATIO OF TOTAL THICKNESS OF BOTH OUTER LAYER PORTIONS TO THICKNESS OF EFFECTIVE LAYER PORTION (%) | 400 | 88 | 73 | 54 | 33 | 43 | 21 |
| RATIO OF TOTAL THICKNESS OF BOTH OUTER LAYER PORTIONS TO DIMENSION t OF STACKED BODY (%) | 80 | 47 | 42 | 35 | 25 | 30 | 18 |

According to Table 1, with sample number 1, although external electrodes 14, 15 covered a portion of lateral surfaces 12c, 12d, 12e, 12f, it would be difficult to ensure a desired capacitance because the total thickness of both outer layer portions 16a was as much as four times larger than dimension t' of effective layer portion 16b in stacking direction x.

On the other hand, with sample numbers 2 to 7, the ratio of dimension t' of effective layer portion 16b in stacking direction x to dimension t of stacked body 12 in stacking direction x was not less than about 53% and not more than about 83%. With any of these samples, external electrodes 14, 15 can cover a portion of lateral surfaces 12c, 12d, 12e, 12f, ensuring a desired capacitance. Also, with sample numbers 2 to 7, the ratio of the total thickness of both outer layer portions 16a to dimension t' of effective layer portion 16b in stacking direction x was not less than about 21% and not more than about 88%. With any of these samples, external electrodes 14, 15 can reliably cover a portion of lateral surfaces 12c, 12d, 12e, 12f, ensuring a desired capacitance. Further, with sample numbers 2 to 7, the ratio of the total thickness of both outer layer portions 16a to dimension t of stacked body 12 in stacking direction x was not less than about 18% and not more than about 47%. With any of these samples, external electrodes 14, 15 can more reliably cover a portion of lateral surfaces 12c, 12d, 12e, 12f, ensuring a desired capacitance.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a stacked body including a plurality of dielectric layers and a plurality of internal electrodes that are stacked in a stacking direction, the stacked body including:
a first main surface and a second main surface opposite to each other in the stacking direction;
a first lateral surface and a second lateral surface opposite to each other in a longitudinal direction orthogonal or substantially orthogonal to the stacking direction; and
a third lateral surface and a fourth lateral surface opposite to each other in a width direction orthogonal or substantially orthogonal to the stacking direction and the longitudinal direction; and
a plurality of external electrodes disposed on the lateral surfaces of the stacked body; wherein
the plurality of internal electrodes include a plurality of first internal electrodes and a plurality of second internal electrodes alternately stacked, with the plurality of dielectric layers interposed therebetween;

the plurality of first internal electrodes include:
first leading portions extending to the first lateral surface; and
second leading portions extending to the second lateral surface;
the plurality of second internal electrodes include:
third leading portions extending to the first lateral surface; and
fourth leading portions extending to the second lateral surface;
the plurality of external electrodes include:
a first external electrode connected to the first leading portions and covering the first leading portions exposed at the first lateral surface, the first external electrode covering a portion of each of the first main surface, and the first lateral surface;
a second external electrode connected to the second leading portions and covering the second leading portions exposed at the second lateral surface, the second external electrode covering a portion of each of the first main surface, and the second lateral surface;
a third external electrode connected to the third leading portions and covering the third leading portions exposed at the first lateral surface, the third external electrode covering a portion of each of the first main surface, and the first lateral surface; and
a fourth external electrode connected to the fourth leading portions and covering the fourth leading portions exposed at the second lateral surface, the fourth external electrode covering a portion of each of the first main surface, and the second lateral surface;
the plurality of dielectric layers include outer layer portions and an effective layer portion;
one of the outer layer portions is located adjacent to the first main surface of the stacked body, and another of the outer layer portions is located adjacent to the second main surface of the stacked body;
the one of the outer layer portions is one of the plurality of dielectric layers that is located between the first main surface and one of the plurality of internal electrodes that is closest to the first main surface;
the another of the outer layer portions is one of the plurality of dielectric layers that is located between the second main surface and one of the plurality of internal electrodes that is closest to the second main surface;
each of the outer layer portions is not more than about 12 μm in thickness in the stacking direction;
the effective layer portion is a region sandwiched between the outer layer portions;
where a dimension of the stacked body in the stacking direction is denoted by t, and a dimension of the effective layer portion in the stacking direction is denoted by t', a ratio of the dimension t' of the effective layer portion in the stacking direction to the dimension t of the stacked body in the stacking direction is not less than about 53% and not more than about 83%;

the dimension t of the stacked body in the stacking direction is not less than about 30 μm and not more than about 80 μm;

a dimension T of the multilayer ceramic capacitor in the stacking direction satisfies about 50 μm≤T≤about 110 μm;

L≤750 μm is satisfied, where L denotes the maximum dimension between two outermost lateral surfaces of opposing ones of the external electrodes;

the first external electrode is electrically connected to the first leading portions at the first lateral surface;

the second external electrode is electrically connected to the second leading portions at the second lateral surface;

the third external electrode is electrically connected to the third leading portions at the first lateral surface;

the fourth external electrode is electrically connected to the fourth leading portions at the second lateral surface; and $d_3 \le d_2 \le d_1$, where $d_1$ denotes a thickness of at least one of the plurality of external electrodes in the longitudinal direction or the width direction in a same plane as an internal electrode located closest to one of the first and second main surfaces, $d_2$ denotes a thickness of at least one of the plurality of external electrodes in the stacking direction, at a ½ position in the longitudinal direction or the width direction, located on one of the first and second main surfaces, and $d_3$ denotes a thickness of at least one of the plurality of external electrodes in the longitudinal direction or the width direction, at the ½ position in the stacking direction, located on at least one of the first, second, third, and fourth lateral surfaces.

2. The multilayer ceramic capacitor according to claim 1, wherein the first leading portions exposed at the first lateral surface of the stacked body, and the second leading portions exposed at the second lateral surface of the stacked body are not less than about 135 μm and not more than about 195 μm in dimension in the longitudinal direction and the width direction; and the third leading portions exposed at the first lateral surface of the stacked body, and the fourth leading portions exposed at the second lateral surface of the stacked body are not less than about 135 μm and not more than about 195 μm in dimension in the longitudinal direction and the width direction.

3. The multilayer ceramic capacitor according to claim 1, wherein a ratio of a total thickness of both of the outer layer portions to the dimension of the effective layer portion in the stacking direction is not less than about 21% and not more than about 88%.

4. The multilayer ceramic capacitor according to claim 1, wherein a ratio of a total thickness of both of the outer layer portions to the dimension of the stacked body in the stacking direction is not less than about 18% and not more than about 47%.

5. The multilayer ceramic capacitor according to claim 1, wherein corners and ridge lines of the stacked body are rounded.

6. The multilayer ceramic capacitor according to claim 1, wherein a dimension of each of the outer layer portions is not less than about 3 μm.

7. The multilayer ceramic capacitor according to claim 1, wherein an average thickness of each the plurality of dielectric layers is not less than about 0.4 μm and not more than about 1.0 μm.

8. The multilayer ceramic capacitor according to claim 1, wherein an average thickness of each the plurality of dielectric layers is not less than about 0.4 μm and not more than about 0.8 μm.

9. The multilayer ceramic capacitor according to claim 1, wherein an average thickness of each the plurality of dielectric layers is not less than about 0.4 μm and not more than about 0.6 μm.

10. The multilayer ceramic capacitor according to claim 1, wherein the plurality of first internal electrodes include first facing portions facing the first and second main surfaces; and the plurality of second internal electrodes include second facing portions facing the first and second main surfaces.

11. The multilayer ceramic capacitor according to claim 10, wherein the stacked body includes a first lateral portion defined by one end of the first facing portions in the longitudinal direction and the first lateral surface, and a second lateral portion defined by another end of the second facing portions in longitudinal direction and the second lateral surface.

12. The multilayer ceramic capacitor according to claim 11, wherein an average dimension of the first and second lateral portions of the stacked body is not less than about 10 μm and not more than about 70 μm.

13. The multilayer ceramic capacitor according to claim 11, wherein an average dimension of the first and second lateral portions of the stacked body is not less than about 10 μm and not more than about 50 μm.

14. The multilayer ceramic capacitor according to claim 11, wherein an average dimension of the first and second lateral portions of the stacked body is not less than about 10 μm and not more than about 30 μm.

15. The multilayer ceramic capacitor according to claim 1, wherein the first leading portions extend to the first and third lateral surfaces;

the second leading portions extend to the second and fourth lateral surfaces;

the third leading portions extend to the first and fourth lateral surfaces; and the fourth leading portions extend to the second and third lateral surfaces.

16. The multilayer ceramic capacitor according to claim 1, wherein the first external electrode covers a portion of each of the first main surface and the second main surface;

the second external electrode covers a portion of each of the first main surface and the second main surface;

the third external electrode covers a portion of each of the first main surface and the second main surface; and the fourth external electrode covers a portion of each of the first main surface and the second main surface.

17. The multilayer ceramic capacitor according to claim 15, wherein the first external electrode covers a portion of each of the first main surface and the second main surface;

the second external electrode covers a portion of each of the first main surface and the second main surface;

the third external electrode covers a portion of each of the first main surface and the second main surface; and the fourth external electrode covers a portion of each of the first main surface and the second main surface.

* * * * *